United States Patent
Haga et al.

(10) Patent No.: US 10,185,300 B2
(45) Date of Patent: Jan. 22, 2019

(54) NUMERICAL CONTROLLER REESTABLISHING MACHINE COORDINATE VALUE BY USING ABSOLUTE POSITION DETECTOR

(71) Applicant: FANUC Corporation, Minamitsuru-gun, Yamanashi (JP)

(72) Inventors: Makoto Haga, Minamitsuru-gun (JP); Satoshi Kimura, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 236 days.

(21) Appl. No.: 15/046,589

(22) Filed: Feb. 18, 2016

(65) Prior Publication Data

US 2016/0259319 A1    Sep. 8, 2016

(30) Foreign Application Priority Data

Mar. 3, 2015    (JP) .................................. 2015-41755

(51) Int. Cl.
*G06F 19/00* (2018.01)
*G05B 19/402* (2006.01)
(Continued)

(52) U.S. Cl.
CPC ........... *G05B 19/402* (2013.01); *G05B 15/02* (2013.01); *G05B 19/401* (2013.01);
(Continued)

(58) Field of Classification Search
CPC ........ G05B 19/402; G05B 2219/35581; G05B 15/02; G05B 19/401; G05B 2219/41098; G05B 2219/42204; G05B 2219/42231
See application file for complete search history.

(56) References Cited

U.S. PATENT DOCUMENTS 5,077,507 A * 12/1991 Mitani ................. G05B 19/232
                                                       318/490
5,187,724 A *  2/1993 Hibino ............... B23Q 3/15526
                                                         377/17

(Continued)

FOREIGN PATENT DOCUMENTS

CN    1540467 A    10/2004
CN    1722034 A     1/2006
(Continued)

OTHER PUBLICATIONS

The Notification of the First Office Action dated Jun. 23, 2017 in Chinese Patent Application No. 2016101217804 (6 pages) with an English translation (9 pages).

(Continued)

*Primary Examiner* — Michael D Masinick
(74) *Attorney, Agent, or Firm* — Drinker Biddle & Reath LLP

(57) ABSTRACT

A numerical controller for controlling a machine receives an instruction to reestablish a machine coordinate value of a movable part of the machine and stops a servo motor driving the movable part. When the servo motor is stopped, the numerical controller acquires position information of a position detector provided to the servo motor. Then, the numerical controller updates the machine coordinate value of the movable part based on the position information, and further updates the absolute coordinate value of the movable part based on the updated machine coordinate value.

4 Claims, 3 Drawing Sheets

(51) Int. Cl.
*G05B 15/02* (2006.01)
*G05B 19/401* (2006.01)

(52) U.S. Cl.
CPC .............. *G05B 2219/35581* (2013.01); *G05B 2219/41098* (2013.01); *G05B 2219/42204* (2013.01); *G05B 2219/42231* (2013.01)

(56) References Cited

U.S. PATENT DOCUMENTS

| | | | |
|---|---|---|---|
| 5,825,150 A * | 10/1998 | Kachi | G05B 19/4062 318/610 |
| 1,540,467 A1 | 10/2004 | Endo et al. | |
| 1,722,034 A1 | 12/2005 | Genma et al. | |
| 2006/0235565 A1 | 10/2006 | Endo et al. | |
| 2010/0026230 A1* | 2/2010 | Lee | G05B 19/19 318/627 |
| 2010/0188035 A1* | 7/2010 | Abeta | B23Q 15/02 318/570 |
| 2013/0090754 A1 | 4/2013 | Abe | |
| 2014/0081428 A1* | 3/2014 | Rudberg | G05B 19/02 700/66 |
| 2015/0362906 A1* | 12/2015 | Kuroki | G05B 19/195 700/114 |

FOREIGN PATENT DOCUMENTS

| | | |
|---|---|---|
| EP | 2579117 A2 | 4/2013 |
| JP | 58-058613 U | 4/1983 |
| JP | S62-95604 A | 5/1987 |
| JP | H08-234844 A | 9/1996 |
| JP | 2000-099156 A | 4/2000 |
| JP | 2010-225034 A | 10/2010 |
| JP | 2010-238174 A | 10/2010 |
| JP | 5168738 B2 | 3/2013 |
| JP | 2013-084102 A | 5/2013 |

OTHER PUBLICATIONS

Office Action dated Jul. 5, 2016 in Japanese Application No. 2015-041755 (3 pages) with English translation (3 pages).

* cited by examiner

NUMERICAL CONTROLLER REESTABLISHING MACHINE COORDINATE VALUE BY USING ABSOLUTE POSITION DETECTOR

RELATED APPLICATION DATA

This application claims priority under 35 U.S.C. § 119 and/or § 365 to Japanese Application No. 2015-41755 filed Mar. 3, 2015, the entire contents is incorporated herein by reference.

BACKGROUND OF THE INVENTION

Field of the Invention

The present invention relates to a numerical controller and particularly to a numerical controller capable of a safe and easy reestablishment of a machine coordinate value in the lock state that allows controlling the position of a servo motor.

Description of the Related Art

A machine tool controlled by a numerical controller using an absolute position detector may cause a deviation between a machine coordinate value controlled by the numerical controller and position information of the absolute position detector indicating the position of a servo motor after the power activation.

For example, even in the lock state allowing the position control, when a servo motor is operated by a speed control without a position control, sometimes a machine coordinate value may not be updated. As a result, although the position information of the absolute position detector indicates the correct position of the servo motor, it comes to discord with the machine coordinate value controlled by the numerical controller. In this case, the machine coordinate value needs to be reproduced based on the position information of the absolute position detector.

As a technique that reestablishes a machine coordinate value after the power activation of a numerical controller, a technique in which the numerical controller stops a movable part of the machine tool at any position and reads the numerical value indicated by the absolute position detector, measures the distance between the stop position and the machine origin, and then corrects the numerical value indicated by the absolute position detector based on the measured distance is disclosed in Japanese Patent Application Laid-Open No. 62-095604. In addition, a technique in which the present position is determined when the state of the servo motor is shifted from a free state in which the servomotor position is uncontrollable to a lock state in which the position is controllable is disclosed in Japanese Patent Application Laid-Open No. 2010-225034.

In the prior art disclosed in Japanese Patent Application Laid-Open No. 62-095604 described above, the machine origin is established from the unestablished state of the machine origin and the position information on the absolute position detector side is updated. Therefore, the relationship between the actual machine position and the position information of the absolute position detector is reset. To be specific, when the numerical controller has lost a correct machine coordinate value, a difference is caused between the target machine positions of the movement by the same instruction before and after the update. Thus, the prior art cannot continue the work throughout before and after the update of the position information on the absolute position detector side. Moreover, a manual operation for the movement to the machine origin becomes necessary and requires time.

Furthermore, when the prior art disclosed in Japanese Patent Application Laid-Open No. 2010-225034 is used to establish the machine origin of a gravity axis, since the free state of the servo motor causes a risk of falling of the gravity axis, a device for mechanically fixing the gravity axis becomes necessary and increases the cost. Further, the machine needs to be stopped once, which makes continuous work difficult.

SUMMARY OF THE INVENTION

Here, an object of the present invention is to provide a numerical controller capable of a safe and easy reestablishment of the machine coordinate value in the lock state that allows controlling the position of the servo motor.

A numerical controller according to the present invention controls a machine including a movable part driven by a servo motor having a position detector. The numerical controller includes: an axis stop unit configured to output an instruction to stop the servo motor upon receiving an instruction to reestablish a machine coordinate value of the movable part; a machine coordinate value updating unit configured to acquire, when the axis stop unit stops the servo motor, position information of the position detector and update, based on the acquired position information, the machine coordinate value of the movable part; and an absolute coordinate value updating unit configured to update, based on the machine coordinate value updated by the machine coordinate value updating unit, an absolute coordinate value of the movable part.

The instruction to reestablish the machine coordinate value of the movable part may be issued based on a signal operation to the numerical controller.

The position detector may be an absolute position detector.

According to the numerical controller based on the present invention, a rapid reestablishment of a machine coordinate value without an interruption of the operation is made possible because the numerical controller conducts the reestablishment of the machine coordinate value in the lock state that allows the position control of the servo motor by receiving a signal operation as a trigger after the power activation. Further, when the same instruction is conducted, the numerical controller allows the servo motor to move to a machine position that is the same as that before the numerical controller loses the correct machine coordinate value because the numerical controller reestablishes the machine coordinate value by reading out the position information from the absolute position detector. Hence, a readjustment of the work program, the machine or others becomes unnecessary. Due to the above, the present invention reduces time for reestablishing the machine coordinate value, which leads to the improvement of the productivity.

Moreover, since the machine coordinate value is reestablished in the lock state that allows controlling the servo motor, even though a gravity axis has a risk of falling in the free state, the machine coordinate value can be reestablished safely and easily. For a gravity axis in the free state, a device for mechanically fixing it is needed and thus the present invention is effective to reduce the cost of the machine tools.

BRIEF DESCRIPTION OF THE DRAWINGS

The forgoing and other objects and feature of the invention will be apparent from the following description of preferred embodiments of the invention with reference to the accompanying drawings, in which.

DETAILED DESCRIPTION OF THE PREFERRED EMBODIMENTS

A numerical controller according to the present invention enables a rapid reestablishment of a machine coordinate value by a signal operation without moving an axis in a power activated state of a machine tool. Further, the numerical controller can select an axis for which the machine coordinate value is reestablished. At this time, an absolute coordinate value is preset in accordance with the reestablishment of the machine coordinate value.

Here, the term "machine coordinate value" is a coordinate value in the coordinate system (machine coordinate system) based on the machine origin and the term "absolute coordinate value" is a coordinate value in the coordinate system (an absolute coordinate system, a workpiece coordinate system or a program coordinate system) based on the workpiece origin. The term "workpiece origin" means a position shifted from the machine origin so that the coordinate system based on the workpiece may be established.

Figure 1:
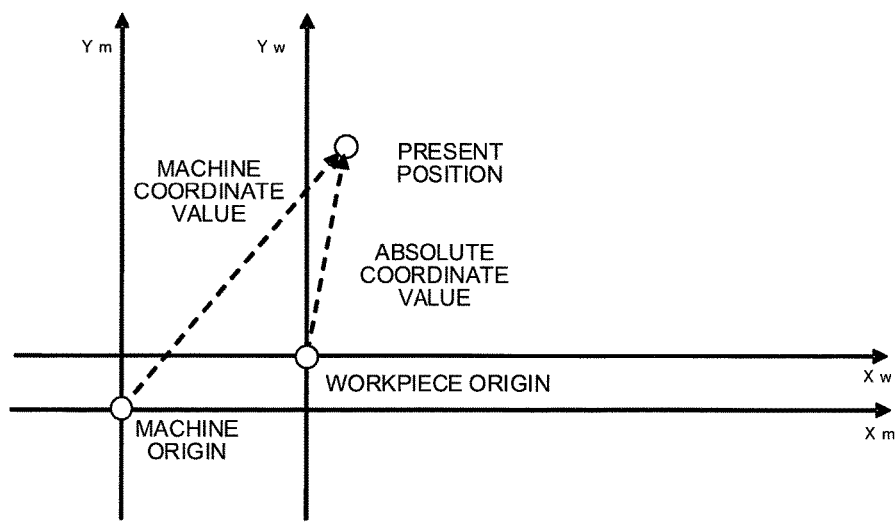
FIG. 1 is an explanatory diagram showing a machine coordinate system and an absolute coordinate system.

In the description hereinafter, as shown in FIG. 1, it is assumed that a coordinate system defining the machine origin as the origin of coordinate system is the machine coordinate system denoted by Xm and Ym, and a coordinate value indicating the present position in the machine coordinate system is the machine coordinate value. Further, it is assumed that a coordinate system defining the workpiece origin as the origin of coordinate system is the workpiece coordinate system denoted by Xw and Yw, and a coordinate value indicating the present position in the workpiece coordinate system is the absolute coordinate value.

Since the absolute position detector and establishment of the machine origin have been publicly known by means of Japanese Patent Application Laid-Open No. 2013-084102 or other literatures, the description here will be omitted.

Hereinafter, embodiments of the present invention will be described together with figures.

Figure 2:
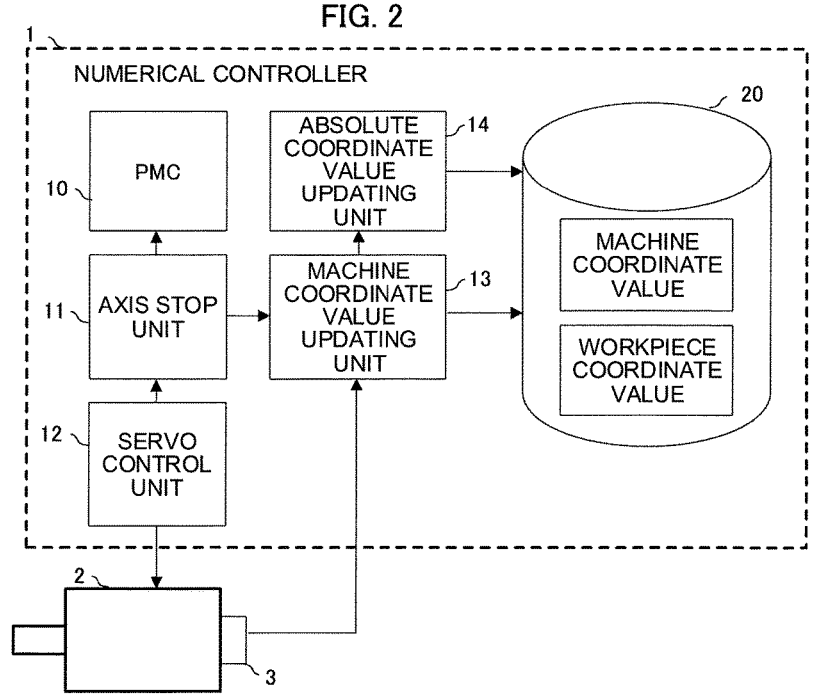
FIG. 2 is a functional block diagram showing a numerical controller according to an embodiment of the present invention.

FIG. 2 is a functional block diagram of a numerical controller according to an embodiment of the present invention. A numerical controller 1 of the present embodiment is provided with a programmable machine controller (PMC) 10, an axis stop unit 11, a servo control unit 12, a machine coordinate value updating unit 13 and an absolute coordinate value updating unit 14.

The PMC 10 controls an auxiliary device of a machine tool by outputting signals to the auxiliary device based on a sequence program stored in the numerical controller 1. Further, the PMC 10 receives signals from various switches or the like on a control panel provided to the machine tool body and conducts necessary processing for the signals and then outputs processed signals to respective parts of the numerical controller 1. This PMC 10, upon receiving a signal operation, outputs a signal for starting reestablishment processing of the machine coordinate value to the axis stop unit 11.

The axis stop unit 11, upon receiving the signal from the PMC 10, confirms whether the axis for which the machine coordinate value is to be reestablished is stopped or not, and after the confirmation of the stoppage, the axis stop unit 11 instructs the servo control unit 12 to prohibit the movement of the axis and also instructs the machine coordinate value updating unit 13 to update the machine coordinate value.

The axis for which the machine coordinate value is reestablished is selected in advance by the setting of parameters or the like.

The servo control unit 12 controls the movement of the servo motor 2 in accordance with the operation control by the numerical controller 1. Further, the servo control unit 12, upon receiving an instruction from the axis stop unit 11, cuts off instructions for movements regarding the servo motor 2 issued based on the operation control to prohibit the movements of the servo motor 2.

The machine coordinate value updating unit 13, upon receiving an instruction from the axis stop unit 11, acquires the position information stored in the absolute position detector 3 provided to the servo motor 2, and updates the absolute coordinate value of the numerical controller 1 stored in the memory 20 based on the acquired position information, thereby outputting the updated machine coordinate value to the absolute coordinate value updating unit 14.

The absolute coordinate value updating unit 14 updates the absolute coordinate value of the numerical controller 1 stored in the memory 20 based on the machine coordinate value updated by the machine coordinate value updating unit 13.

Figure 3:
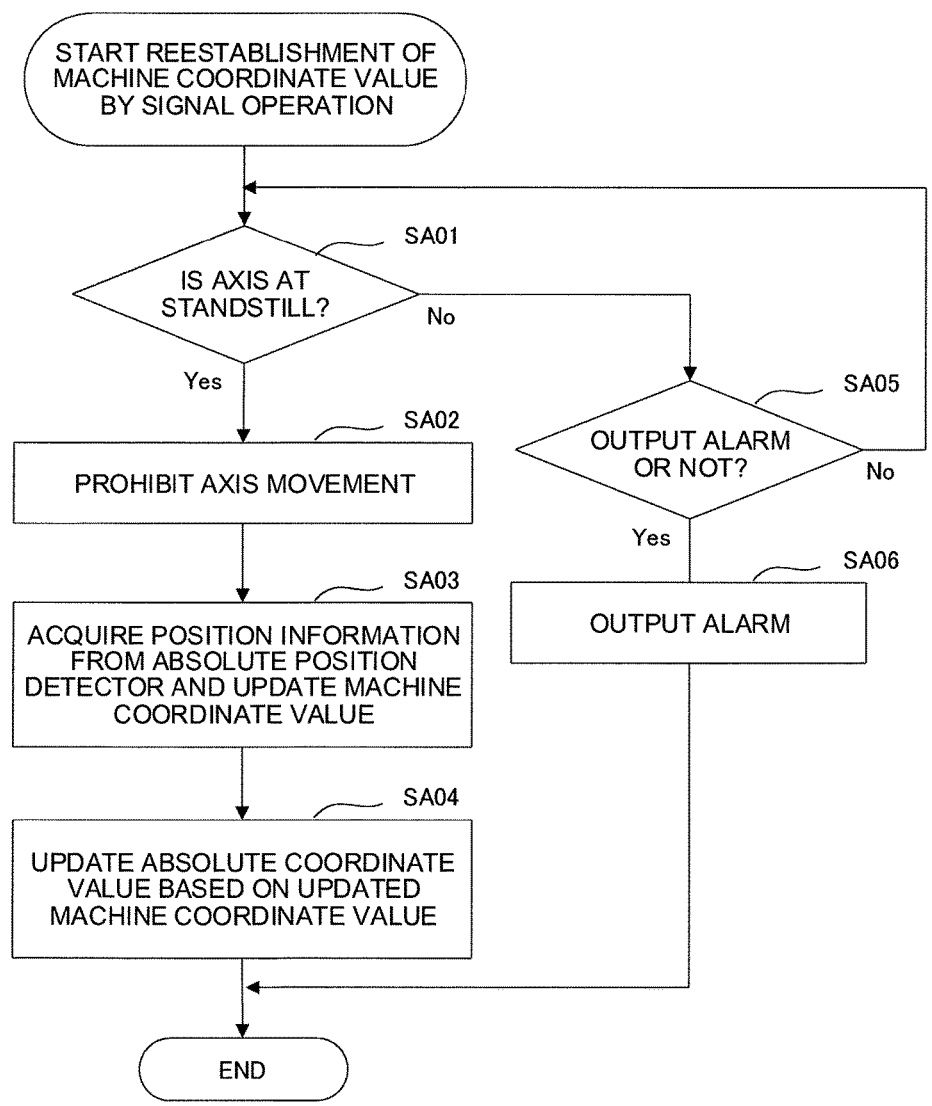
FIG. 3 is a flow chart showing a flow of process executed in the numerical controller in FIG. 2.

Hereinafter, the flow of processing executed in the numerical controller 1 configured in this manner will be described based on a flowchart of reestablishment processing of the machine coordinate value and absolute coordinate value in FIG. 3, and transition diagrams of the coordinate system on which the machine coordinate value and absolute coordinate value are updated in FIGS. 4A to 4C.

At the starting point of processing of reestablishment of the machine coordinate value and absolute coordinate value, the machine coordinate value controlled by the numerical controller 1 has been lost (FIG. 4A), and the reestablishment of the machine coordinate value is started by a trigger made when a signal for starting the reestablishment of the machine coordinate value issued by a signal operation or the like is received by the PMC 10. It is assumed that an automatic operation by the position control follows the end of this processing.

[Step SA01] The axis stop unit 11 confirms whether the axis for which the machine coordinate value is to be reestablished is stopped or not. When the axis for which the machine coordinate value is to be reestablished is not stopped, the processing proceeds to Step SA05, and when the axis is stopped, the processing proceeds to Step SA02.

[Step SA02] The axis stop unit 11 prohibits the axis to move.

Figure 4A:
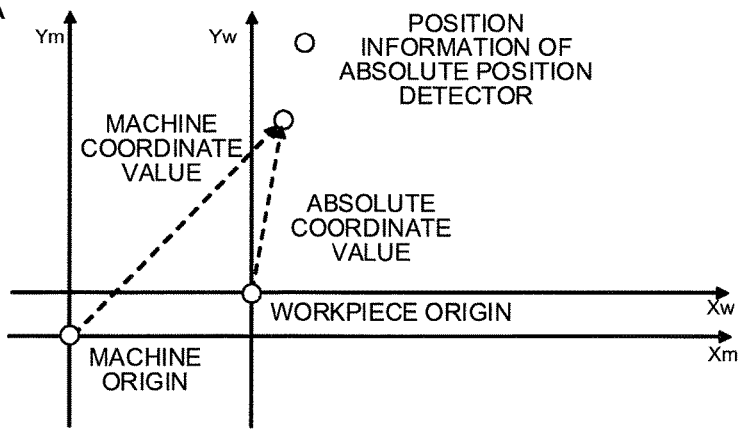
FIGS. 4A to 4C are transition diagrams in a coordinate system in which a machine coordinate value and an absolute coordinate value are updated.
Figure 4B:
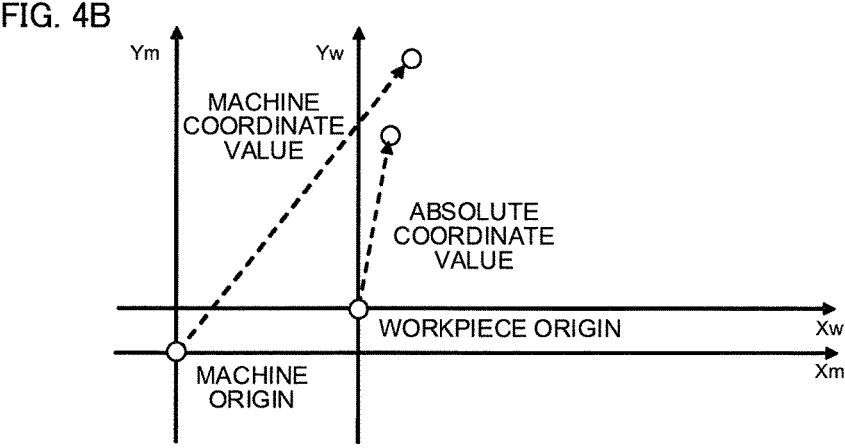

[Step SA03] The machine coordinate value updating unit 13 acquires the position information stored in the absolute position detector 3 and updates, based on the acquired position information, the machine coordinate value of the numerical controller 1 stored in the memory 20 (FIG. 4B).

Figure 4C:
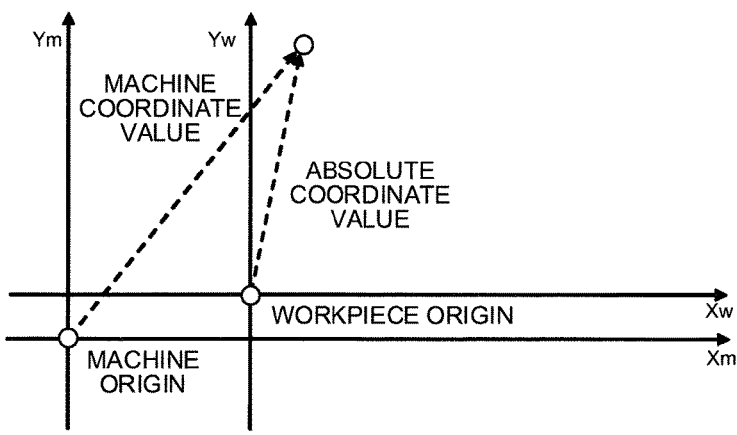

[Step SA04] The absolute coordinate value updating unit 14 updates, based on the machine coordinate value updated by the machine coordinate value updating unit 13, the absolute coordinate value of the numerical controller 1 stored in the memory 20 (FIG. 4C).

[Step SA05] Whether to output the alarm indicating that the axis is not stopped is determined according to the setting or the like in the numerical controller 1. When the alarm is output, the processing proceeds to Step SA06, and when the alarm is not output, the processing returns to Step SA01 to continue confirming the stop of the axis.

[Step SA06] The alarm informing that the axis is not stopped is output and the processing is terminated.

FIG. 4A shows a state (state in which the machine coordinate value is lost) in which the machine coordinate value and absolute coordinate value do not accord with the position information (the position of the servo motor) of the absolute position detector 3 before processing at Step SA03. FIG. 4B shows that the machine coordinate value is updated based on the position information of the absolute position detector in Step SA03 and the updated machine coordinate value and the position information (the position of the servo motor) of the absolute position detector accord with each other. Further, FIG. 4C shows that the absolute coordinate value is updated based on the machine coordinate value updated in Step SA04.

As described above, the numerical controller according to the present embodiment enables a rapid reestablishment of the machine coordinate value by a signal operation without moving the axis while the machine tool is in the power-on state and thus can reestablish the machine coordinate value and absolute coordinate value safely.

Though embodiments of the present invention have been described above, the present invention is not limited to the examples of embodiments described above and can be implemented in various aspects by making an appropriate modifications.

The invention claimed is:

1. A numerical controller for controlling a machine including a movable part driven by a servo motor having a position detector, the numerical controller comprising:
   an axis stop unit configured to output an instruction to stop the servo motor upon receiving an instruction to reestablish a machine coordinate value of the movable part;
   a machine coordinate value updating unit configured to acquire, when the axis stop unit stops the servo motor, position information of the servo motor detected by the position detector and update, based on the acquired position information, the machine coordinate value of the movable part; and
   an absolute coordinate value updating unit configured to update, based on the machine coordinate value updated by the machine coordinate value updating unit, an absolute coordinate value of the movable part,
   wherein the servo motor is stopped until the absolute coordinate value of the movable part is updated.

2. The numerical controller according to claim 1, wherein the instruction to reestablish the machine coordinate value of the movable part is issued based on a signal operation to the numerical controller.

3. The numerical controller according to claim 1, wherein the position detector is an absolute position detector.

4. The numerical controller according to claim 2, wherein the position detector is an absolute position detector.

* * * * *